US006356638B1

(12) United States Patent
Hardy et al.

(10) Patent No.: US 6,356,638 B1
(45) Date of Patent: Mar. 12, 2002

(54) RADIO WIRELINE INTERFACE AND METHOD FOR SECURE COMMUNICATION

(75) Inventors: Douglas Allan Hardy, Scottsdale; Peter J. Armbruster, Chandler, both of AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/124,719

(22) Filed: Jul. 30, 1998

(51) Int. Cl.[7] .............................................. H04L 09/00
(52) U.S. Cl. ......................... 380/275; 380/270; 380/42
(58) Field of Search ................................ 380/275, 270, 380/42

(56) References Cited

U.S. PATENT DOCUMENTS 4,167,700 A * 9/1979 Coe et al. .................... 380/33
4,815,128 A 3/1989 Malek .......................... 380/9
5,361,302 A 11/1994 Malek et al. ................. 380/48
5,504,802 A 4/1996 Kennedy et al. .............. 379/58
5,878,036 A * 3/1999 Spartz et al. ............... 370/335

* cited by examiner

*Primary Examiner*—Thomas R. Peeso
(74) *Attorney, Agent, or Firm*—Jenner & Block, LLC

(57) ABSTRACT

An interface between a digital communication system and a PSTN establishes a user configurable secure encrypted link to a digital subscriber unit through the digital communication system, and provides clear (unencrypted) voice to telephone sets through the PSTN. The interface includes a security module for encrypting and decrypting information with user specific algorithms and keys, a transcoder for converting modulated voice to digital voice and a modem for modulating and demodulating data and encrypted voice. Accordingly, the wireline interface allows for user specified security over a digital wireless portion of an end-to-end communication channel. The interface also provides for the communication of unencrypted voice followed by secure voice or secure data.

20 Claims, 3 Drawing Sheets

RADIO WIRELINE INTERFACE AND METHOD FOR SECURE COMMUNICATION

FIELD OF THE INVENTION

This invention relates in general to the field of secure communication, in particular to secure communication between digital and analog communication systems.

BACKGROUND OF THE INVENTION

One problem with today's wireless communication systems is security of the information communicated over radio frequency (RF) links. Typical digital systems that provide some security, for example, encrypt the air interface between a mobile handset and a base station. The terrestrial portion of the connection is not encrypted so end-to-end security is not provided. These digital networks that provide security, do not allow for the use of user specific security. For example, digital systems that use standard encryption algorithms, such as GSM's A3/A8 encryption algorithm, do not support substitution of these standard algorithms with custom or user specific algorithms. Accordingly, customers must rely on the standard encryption algorithms provided by the network with reduced confidence and the risk that the security may be compromised.

Another problem with existing digital networks is that calls originally in clear-voice mode can not be transferred easily to secure voice or data mode without establishing a new link through the network. Another problem with existing technology is that large organizations do not have the ability to provide an interworking function between a digital network and the organization's protected private PBX. The organization must connect between the digital network and their private PBX through the PSTN.

Thus what is needed are a method and apparatus for interfacing a digital communication system with the PSTN and providing secure communications over a digital link. What is also needed is a method and apparatus that allows for user specific security through a digital network and provides for the communication of voice followed by data. An apparatus or method that provides for the communication of voice followed by the data, for example, has an advantage of allowing a call to be placed in the clear mode and then converted to an end-to-end secure call.

What is also needed are a method and apparatus that provides an interworking function allowing a large organization to connect between a digital communication system and the organization's protected private PBX.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

In accordance with the preferred embodiments of the present invention, a wireline interface provides an interface between a digital communication system and a PSTN and/or trusted PBX. The present invention provides for establishing a secure link with a digital subscriber unit through the digital communication system. The present invention, in one embodiment, provides clear (unencrypted) voice to telephone sets through the PSTN. The present invention provides for the use of user specified security over a digital wireless portion of an end-to-end communication channel. The present invention also allows for the communication of voice followed by data, and permits clear calls to be transformed into secure calls. The present invention also provides, in another embodiment, for end-to-end encryption in addition to any encryption provided over the air by the digital communication system. The present invention also provides for the connection of a digital network to a trusted PBX. The present invention also provides for the connection of an outside company for providing new communication services independent of the digital network service provider. The present invention also allows for users to turn on and off the security.

Figure 1:
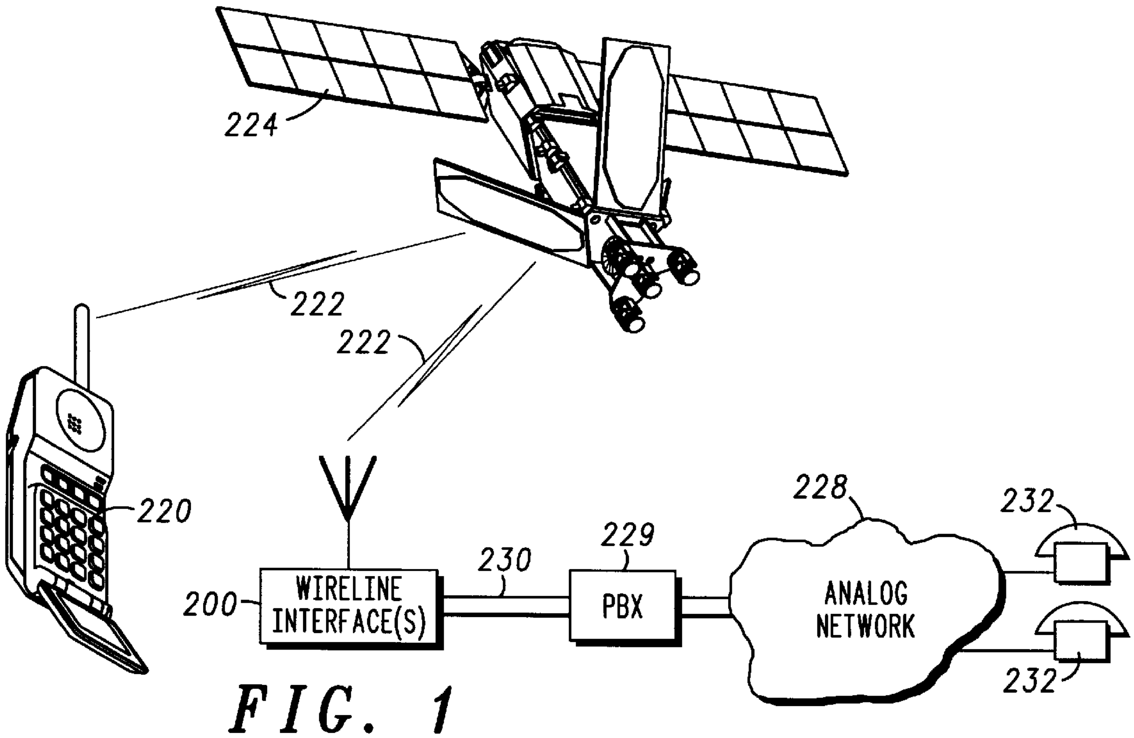
FIG. 1 illustrates a highly simplified diagram of a communication system with which the preferred embodiments of the present invention may be practiced.

FIG. 1 illustrates a highly simplified diagram of a communication system with which the preferred embodiments of the present invention may be practiced. The communication system comprises digital subscriber unit 220, wireline interface 200, analog network 228, analog links 230, digital communication network 224, digital links 222, and analog terminals 232.

Wireline interface 200 is a communication device interfacing between digital communication network 224 and analog network 228, such as a PSTN. Wireline interface 200 comprises elements illustrated in FIG. 2 below for interfacing communications between digital subscriber unit 220 and analog terminals 232. Digital network 224 may comprise any digital communication network such as a GSM network, and may include satellite communication nodes such as nodes of the Iridium network. Analog terminals 232 include analog secure and standard data terminals as well as secure and standard telephone sets.

Digital subscriber unit 220 includes elements to encrypt/transmit and receive/decrypt data (e.g., digitized voice data, facsimile data, digital computer data etc.), thus providing for either unsecure or secure communication through network 224. Digital subscriber units 220 include subscriber units and terminals for communicating digital information over RF or wireline, and include digital cellular telephones with encryption capability. Analog terminals 232 are preferably standard analog telephone sets, and may also include data terminals, and secure terminals with encryption capability such as a STU-III.

Digital subscriber unit 220 produces digital bit streams. Used in conjunction with wireline interface 200, digital subscriber unit 220 establishes a direct digital bit stream channel with wireline interface 200 through digital communication network 224. The direct digital bit stream channel between digital subscriber unit 220 and wireline interface 200 is referred to as the "digital channel".

Analog terminals 232 produce analog signals modulated at a carrier frequency suitable for transmission through an analog network and over analog links 230 to wireline interface 200. Analog links 230 are preferably typical telephone system lines. Digital subscriber unit 220 and digital link 222 may be located anywhere, for example, off-shore, or may be mobile-land or air-based units. Wireline interface 200, analog network 228, analog link 230 and analog terminals 232 are preferably land-based equipment.

When analog terminals 232 comprise a secure terminal, the bit stream produced by the secure terminal is modulated by its internal modem to produce a modulated carrier that may be transmitted via analog link 230. A modulated carrier received via analog link 230 is demodulated by the internal modem of the secure terminal to produce a digital bit stream that may be processed by the secure terminal. Signals communicated via analog links 230 are modulated carriers while signals communicated via digital communication network 224 and digital links 222 are digital bit streams. Because there is a direct digital channel between digital subscriber unit 220 and wireline interface 200, digital subscriber unit 220 uses a modem internal to wireline interface 200 to communicate over analog network 228 to secure terminals. A suitable modem training procedure may be found in U.S. Pat. No. 5,504,802 which is assigned to same assignee as the present invention and herein incorporated by reference.

Wireline interface 200 also allows a channel to be established between wireline interface 200 and a standard telephone set. The end-to-end communication channel comprises a secure communication channel between digital subscriber unit 220 and wireline interface 200 (the digital channel), and, for example, a non-secure communication channel between wireline interface 200 and telephone set through the PSTN. Wireline interface also allows an end-to-end secure communication channel to be established between digital subscriber unit 220, and analog terminals 232.

Although FIG. 1 illustrates analog network 228 coupled between wireline interface 200 and analog terminals 232, in another embodiment of the present invention, wireline interface 200 may couple directly with many analog networks, or with one or more terminals 232 or telephone sets. In another embodiment of the present invention, referred to as the trunked embodiment, a plurality or wireline interfaces 200 are grouped together to form a pool of communication resources and are connected to a private switch or PBX 229 to provide personal interworking functions (IWF) to a group of users with secure and/or standard telephones. In this embodiment, analog network 228 may be a private network within a large organization such as a company. This embodiment is preferred for providing services to groups of users who can share the cost and benefit from a fixed solution.

Figure 2:
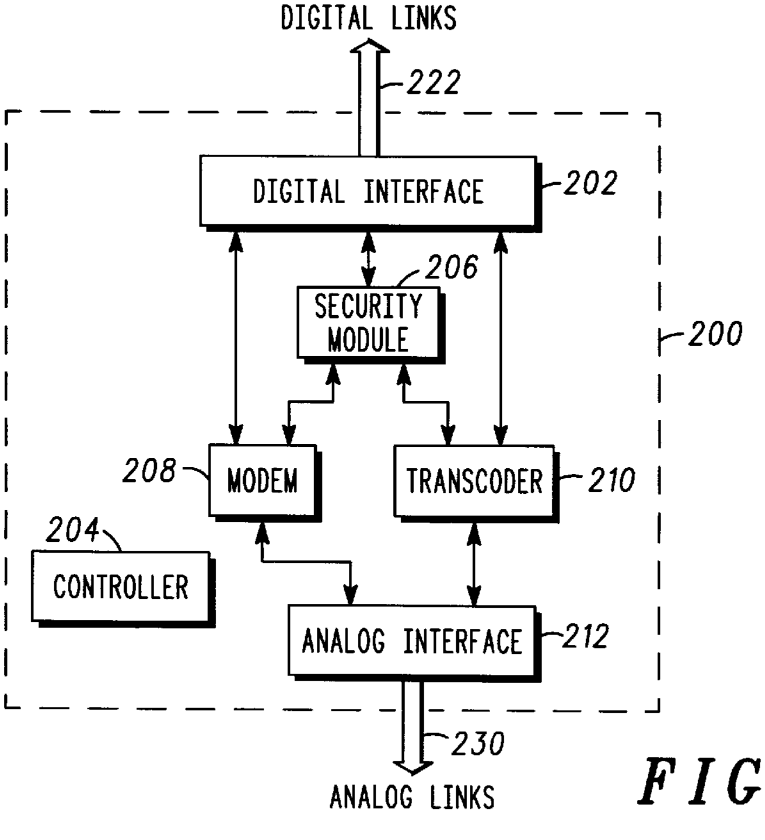
FIG. 2 illustrates a simplified block diagram of a radio wireline interface apparatus in accordance with a preferred embodiment of the present invention.

FIG. 2 illustrates a simplified block diagram of a radio wireline interface apparatus in accordance with a preferred embodiment of the present invention. Wireline interface 200 includes a digital interface 202 for communicating a modulated digital bit stream over a digital communication link established with a digital communication system. Digital interface 202 includes an internal multiplexer under the control of controller 204. Digital interface 202 includes hardware for communicating over RF and wireline digital networks 224. Wireline interface 200 also includes an internal modem 208 coupled to the multiplexer within digital interface 202. Wireline interface 200 also includes an analog network interface 212 which couples wireline interface 200 to an analog network such as a public switch telephone network (PSTN). Modem 208 converts digital bit streams provided by digital interface 202 to analog data modulated with a carrier suitable for transmission on the PSTN. Modem 208 also demodulates digital modulated data received from analog network interface 212 to a digital bit stream for providing the digital bit stream to digital interface 202.

Wireline interface 200 also includes security module 206 for receiving encrypted traffic (i.e., encrypted voice or data) from digital interface 202 and providing decrypted traffic in digital form to either modem 208 or transcoder 210. Security module 206 also encrypts digital voice received from transcoder 210 or data from modem 208 and provides an encrypted signal in a digital bit stream form to digital interface 202.

In the preferred embodiment, security module 206 provides user-specific security which is determined between wireline interface 200 and digital subscriber unit 220, instead of network security which for example, would be same for all users of digital network 224 (FIG. 1). In another embodiment, the user specific security between wireline interface 200 and digital subscriber unit 220 is in addition to any network security typically included with digital network 224. Security module 206 preferably provides, for example, U.S. Government type I security and includes user specific algorithms such as STU-III, DES, RC4, etc. Transcoder 210 functions as a vocoder and converts digital voice received either from digital interface 202 or security module 206 to modulated voice suitable for transmission through the PSTN. Suitable transcoders, for example, are LPC-10 transcoders. Transcoder 210 also converts modulated voice from the PSTN received through analog network interface 212 to a digitized voice and provides the digitized voice in bit stream form to either security module 206 or to digital interface 202.

Controller 204, which is coupled to digital interface 202, modem 208, security module 206, transcoder 210, and analog network interface 212, performs the control functions of wireline interface 200 and instructs these elements of wireline interface 200 to perform, among other things, the tasks described below. Controller 204 preferably includes processors, memory and embedded instruction sets for performing such tasks. Controller 204 may also receive instructions from outside of wireline interface 200.

Figure 3:
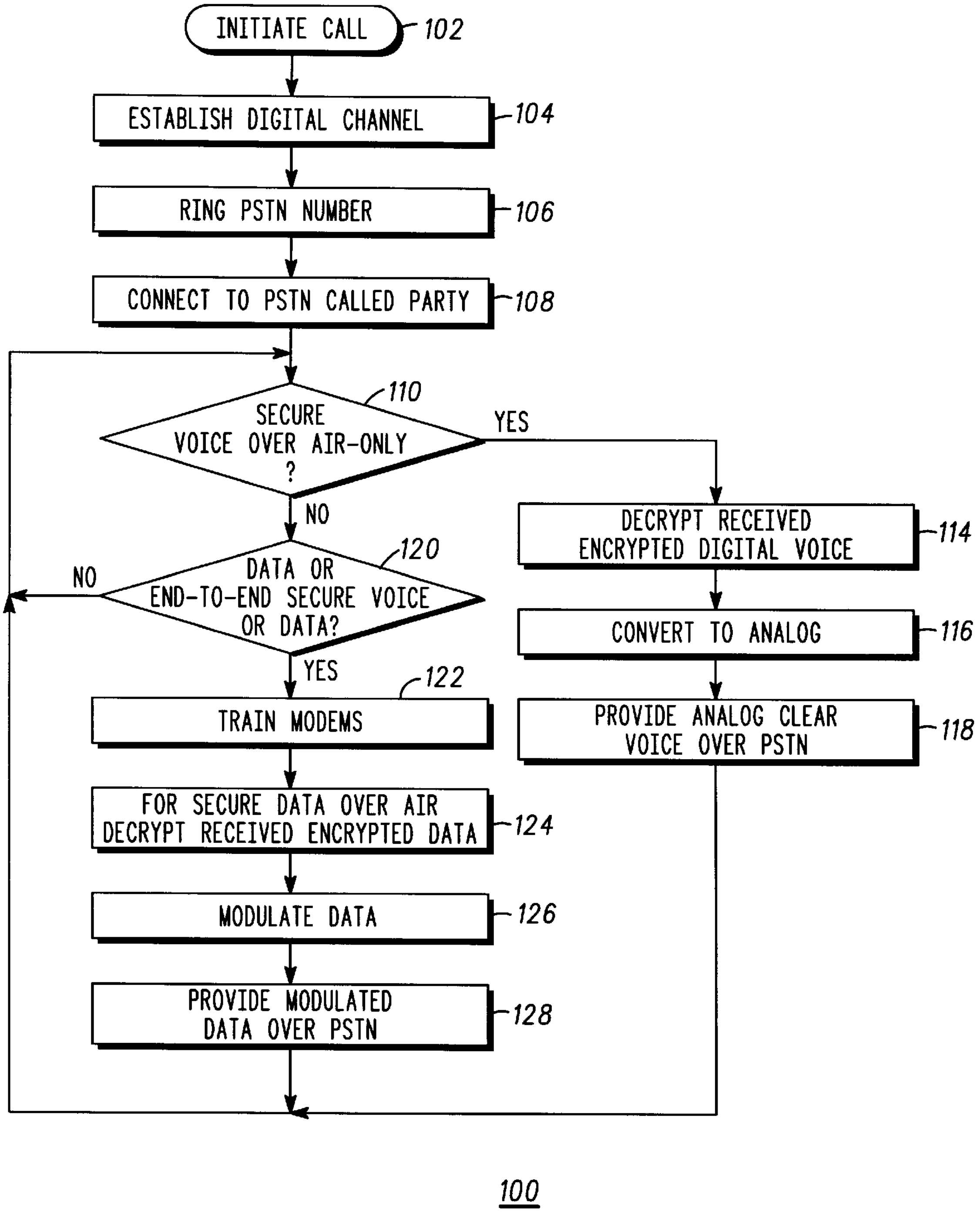
FIG. 3 is a simplified flow chart of a communication procedure in accordance with a preferred embodiment of the present invention.

FIG. 3 is a simplified flow chart of a communication procedure in accordance with a preferred embodiment of the present invention. In the preferred embodiment of the present invention, communication procedure 100 is performed, for example, by the radio wireline interface (FIG. 2). The tasks of communication procedure 100 are preferably performed by controller 204 in conjunction with the other elements of wireline interface 200. In task 102, a digital subscriber unit initiates a call to the wireline interface. Preferably the digital subscriber unit calls a telephone number that is associated with the wireline interface on the digital network. The wireline interface preferably operates from the network's perspective, like a digital handset within a digital communication network, such as network 224 (FIG. 1). In task 104, the wireline interface and the digital subscriber unit establish a digital communication channel or link through the digital communication network. In a preferred embodiment of the present invention, the digital subscriber unit and wireline interface establish a encrypted digital link through the communication network, desirably with user specific encryption. In this embodiment, task 104 includes the tasks of determining encryption algorithms and appropriate encryption keys for the establishment of the encrypted digital channel. Preferably, the keys and/or the algorithms are unique to the wireline interface and the digital subscriber unit.

In task 106, the digital subscriber unit provides a network number in the analog network (e.g., a PSTN phone number) for the called party. In the preferred embodiment, once task 104 is completed, the wireline interface provides a dial tone to the digital subscriber unit prior to the digital subscriber unit sending PSTN number to the wireline interface. In response to receiving the PSTN number from the digital subscriber unit, the wireline interface rings the called party by dialing the telephone number of the called party in the PSTN. The wireline interface waits for the called party to answer and in task 108, once the called party answers, a connection is established between the wireline interface and the called party through the PSTN.

When a request to communicate secure voice over the air only is received, task 110 instructs procedure 100 to performs tasks 114–118. Tasks 114–118 are performed when security through the PSTN is not required. The performance of tasks 114–118 provides security through the digital network but does not provide end-to-end security.

For example, when the called party in the analog network does not have a secure phone with encryption capability and a request is received from either party to communicate secure voice over the digital link, tasks 114 through 118 are performed. In the embodiment when task 104 did not establish an encrypted digital link, (e.g., an unencrypted digital link has been established) task 114 includes the steps of establishing an encrypted digital link between digital handset 220 and wireline interface 200. To establish this encrypted digital link, task 114 includes the steps of determining encryption algorithms and encryption keys which are preferably specific to the digital subscriber unit. In task 114, encrypted digital voice is received at the wireline interface over the communication link from the digital subscriber unit. Task 114 decrypts the received encrypted digital voice and provides decrypted digital voice. In the preferred embodiment, task 114 is performed, at least in part, by a security module within the wireline interface.

In task 116, the decrypted digital voice is converted to modulated voice suitable for transmission through the PSTN. In the preferred embodiment, task 116 is performed by a vocoder. In task 118, the modulated clear voice is provided to the called party through the PSTN.

Tasks 114–118 describe a secure communication of voice through a digital network, such as digital communication network 224 (FIG. 1) and the clear (not encrypted) communication of the voice between the wireline interface 200 (FIG. 1) and a standard telephone set over analog network 228 (FIG. 1).

When a request to communicate secure voice over the air only is not received, task 110 instructs procedure 100 to performs task 120. When a request for communication of data is received, or a request to communicate secure data over the air is received, or a request for end-to-end secure communication of either voice or data is received, task 120 instructs the procedure to perform tasks 122–128. For example, when the wireline interface receives a request for secure data or voice communication with a secure terminal with encryption capability, tasks 122, 126 and 128 are performed.

In task 122, a modem within the wireline interface trains with a modem of the secure phone or data terminal through the analog network. Encrypted data or voice is received from the digital subscriber unit through the digital communication network at the wireline interface. In one embodiment of the present invention, when task 104 established an encrypted digital link with the digital subscriber unit, task 122 may include the steps of terminating that encrypted digital link and determining if preferably different encryption algorithms and keys for a secure end-to-end channel. Thus, a new encrypted digital link would be established.

The encrypted data or voice received over the digital link which is converted to a digital bit stream, is modulated with a modem in task 126. In task 128, the modulated encrypted data or voice is provided to the PSTN connection to the called party. The called party, using a secure terminal, for example, demodulates the modulated encrypted voice with its internal modem and decrypts the demodulated encrypted voice before converting the digital voice to modulated voice in its internal vocoder.

Task 124 is an optional task and is not performed when secure voice or secure data are communicated between a digital subscriber unit and a secure voice or data terminal with encryption capability. Task 124 is desirably performed when secure data is communicated over the air (i.e., only secure through the digital network). In this case, task 124 decrypts the encrypted data received through the digital communication network, task 126 modulates the decrypted (clear) data and task 128 provides the modulated data over the PSTN. Accordingly, task 124 is generally not performed when communicating through the PSTN with secure terminals, such as a STU-III terminal.

Thus, through the performance of tasks 122, 126 and 128, secure voice or data may be communicated from a digital handset, such as digital subscriber unit 220 (FIG. 1), through a digital communication network, such as digital communication network 224 (FIG. 1) through wireline interface 200 (FIG. 1) to a secure voice or data terminal through the PSTN.

Alternatively, through the performance of tasks 122, 124, 126, and 128, secure data may be communicated from a digital handset or terminal, such as digital subscriber unit 220 (FIG. 1), through a digital communication network, such as digital communication network 224 (FIG. 1) to wireline interface 200 (FIG. 1), and clear, unencrypted data may be communicated between wireline interface 200 and a data terminal in the PSTN.

In the preferred embodiment of the present invention, either the called party in the PSTN or the party operating the digital subscriber unit in the digital communication network may request secure voice communication. In the case of a standard telephone, a predetermined dialed code, for example, such as "*1" may be used to indicate to the wireline interface, that the parties wish to communicate secure voice. Other codes may be used request for requests for communication of data, secure data over the air, or end-to-end secure communication of either voice or data. In one embodiment of the present invention, where task 104 establishes an encrypted digital link between the subscriber unit and the wireline interface, the wireline interface may receive an encrypted network number from the digital subscriber unit. In this embodiment, wireline interface performs the steps of decrypting the received PSTN number, converting the network number from digital to corresponding DTMF tones and providing the corresponding tones to the analog network to establish the connection through the analog network to the called party (tasks 106 and 108).

Tasks 114 through 128 have been described with respect to information received through the digital communication network from the digital subscriber unit. However, similar tasks are performed for information received from the analog network for subsequent transmission to the digital subscriber unit. This is described below.

Figure 4:
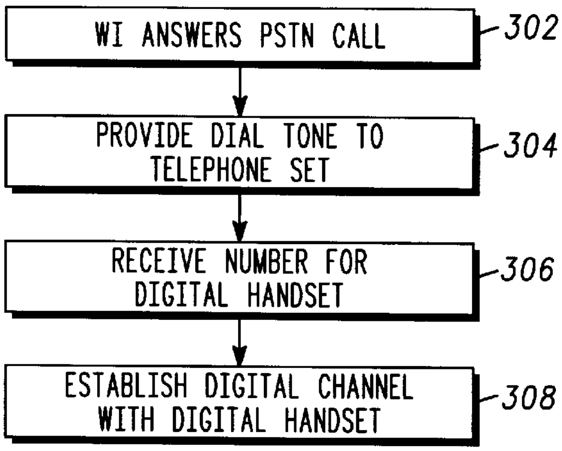
FIG. 4 is a portion of the communication procedure of FIG. 3 in accordance with a preferred embodiment of the present invention performed for calls initiated within an analog network.

Although procedure 100 is described for calls initiated by a digital subscriber unit within the digital communication network, the present invention is equally suitable for calls initiated from terminals and telephones through an analog network. FIG. 4 is a portion of communication procedure 100 (FIG. 3) in accordance with a preferred embodiment of the present invention performed for calls initiated within the analog network. Tasks 302 through 308 are performed in lieu of tasks 102–108 of procedure 100. For example, when the calling party is located within the analog network, the calling party dials a network number associated with wireline interface 200 (FIG. 1). In task 302, the wireline interface (WI) answers the call and in task 304 provides a dial tone to the calling party in the analog network. The number associated with a digital subscriber unit in the digital communication system is dialed by the telephone set and received by the wireline interface in task 306. In task 308, a digital channel is established between the wireline interface and the digital subscriber unit. The digital channel may be a secure link as described in task 104 above. The remaining tasks of procedure 100 are performed as discussed above.

Figure 5:
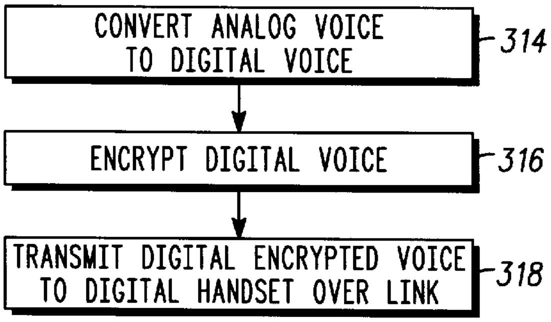
FIGS. 5–6 are portions of the communication procedure of FIG. 3 in accordance with a preferred embodiment of the present invention.
Figure 6:
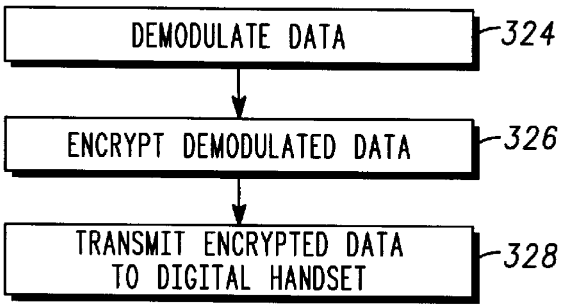

FIGS. 5–6 are portions of communication procedure 100 (FIG. 3) in accordance with a preferred embodiment of the present invention. The portions of communication procedure 100 shown in FIGS. 5–6 are performed for communication information received from the analog network at a wireline interface. Wireline interface 200 (FIG. 2), for example, is suitable for performing these tasks.

When a request to communicate secure voice over the air only (e.g., the digital communication network) is received, tasks 314, 316, and 318 are performed either in lieu of or in addition to tasks 114, 116, and 118 (FIG. 3) for modulated voice received through the analog network. In this embodiment, secure voice is not communicated through the analog network. In task 314, the wireline interface receives an analog voice signal from the called party through the analog network. This analog voice signal is typically modulated voice provided by a typical telephone set. In task 314, a vocoder within the wireline interface converts the modulated voice to a digital bit stream (digital voice). When encryption is enabled in the wireline interface, the digital voice is encrypted in task 316. In task 318, the encrypted digital voice is transmitted through the digital communication system over the established digital link to the digital subscriber unit. The digital subscriber unit includes means for decrypting received digital voice and a vocoder for converting the decrypted digital voice to an analog form suitable for being provided to a speaker. Accordingly, encryption over the air portion of the end-to-end channel is provided.

When a request for communication of data is received, or a request to communicate secure data over the air is received, or a request for end-to-end secure communication of either voice or data is received, task 120 instructs the procedure to perform tasks 324, 326, and 328 in lieu of tasks 124, 126, and 128 (FIG. 3) for data or secure voice received through the PSTN. In this embodiment, end-to-end channel encryption may be provided. The wireline interface receives modulated data (e.g., encrypted voice, encrypted data, or unencrypted data) from the called party through the PSTN. In task 324, the data is demodulated, preferably by a modem within the wireline interface. In one embodiment of the present invention, where unencrypted data is demodulated in task 324, optional task 326 may encrypt the demodulated data. Task 328 transmits the data to the digital handset through the digital communication system over the established digital link.

When encrypted voice or encrypted data demodulated in task 324 is received from a secure terminal such as a STU-III, task 326 is not performed and the demodulated encrypted voice or encrypted data is transmitted in task 328 to the digital handset. Accordingly, end-to-end channel encryption is provided.

In summary, the present invention provides, among other things, for the communication of 1) secure voice over the air described in tasks 114–118, and 314–318; 2) secure data over the air described in tasks 122–128 and 324–328; and 3) end-to-end secure voice or end to end secure data described in tasks 122, 126, 128, 324 and 328. The communication of clear or secure voice may be followed by the communication of data.

Thus, a radio wireline interface and method of secure communication have been described which overcomes specific problems and accomplishes certain advantages relative to prior art methods and mechanisms. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A wireline interface for communicating between a digital subscriber unit and an analog network, the wireline interface comprising:

a digital interface for establishing an encrypted digital link with the digital subscriber unit through a digital communication network, receiving a network number of a called party from the digital subscriber unit over the encrypted digital link, and receiving encrypted digitized voice from the digital subscriber unit over the encrypted digital link;

a security module for decrypting the encrypted digitized voice providing decrypted digitized voice;

a transcoder for converting the decrypted digitized voice to analog voice suitable for transmission through the analog network;

a network interface for establishing a connection with the called party through the analog network and providing the analog voice to the called party;

wherein the wireline interface is coupled between the digital communication network and the analog network, and wherein the digital interface receives a request to initiate the connection with the analog network initiated by the digital subscriber unit, the digital subscriber unit providing a number of the wireline interface to the digital communication network;

the wireline interface includes a controller for causing the digital interface to establish the encrypted digital link;

wherein the controller includes means for causing the digital interface to establish a unencrypted digital link with the digital subscriber unit prior to establishing the encrypted digital link, the digital subscriber unit communicating clear voice over the unencrypted digital link; and wherein the controller has means for receiving a request to communicate secure voice and prior to the digital interface establishing the encrypted digital link, the controller receives the request to communicate secure voice, and subsequent to establishing the encrypted digital link instructs the security module to decrypt received encrypted digitized voice, and instructs the transcoder to provide the analog voice.

2. A wireline interface as claimed in claim 1 wherein the network interface is coupled with a PBX, and wherein the analog network comprises a private telephone system, the PBX providing switching functions for telephones within the private telephone system.

3. A wireline interface as claimed in claim 1 wherein prior to establishing the connection through the analog network, the controller instructs the security module to decrypt the network number, converts the network number from digital to corresponding tones, and instructs the network interface to provide the corresponding tones to the analog network.

4. A wireline interface as claimed in claim 1 wherein prior to establishing the encrypted digital link, the controller, through the digital interface, exchanges call set-up information with the digital subscriber unit, determines an encryption algorithm and an encryption key specific to the encrypted digital link for communicating with the digital subscriber unit.

5. A wireline interface as claimed in claim 1 wherein the request to communicate secure voice comprises a predetermined code indicating the request to communicate secure voice to the controller.

6. A wireline interface as claimed in claim 1 further comprising a modem coupled to the network interface, and wherein the network interface establishes the connection to a secure telephone with encryption capability, the controller instructs the security module to refrain from decrypting the encrypted digitized voice, and the controller instructs the modem to modulate the encrypted digitized voice for transmission through the analog network.

7. A wireline interface as claimed in claim 1 wherein when the controller receives the request to communicate secure voice, the controller instructs the transcoder to convert analog unencrypted voice received from the called party through the analog network to digital voice, and instructs the security module to encrypt the digital voice with an encryption key and an encryption algorithm, and instructs the digital interface to transmit the encrypted digital voice to the digital subscriber unit over the encrypted digital link, the encryption algorithm and encryption key being specific to the encrypted digital link and the digital subscriber unit.

8. A wireline interface as claimed in claim 1 further comprising a modem coupled to the network interface, and wherein when the controller receives a request to communicate secure data, the controller instructs the digital interface to receive encrypted digitized data from the digital subscriber unit over the encrypted digital link, instructs the security module to decrypt the encrypted digitized data, and instructs the modem to modulate the decrypted digitized data, and instructs the network interface to provide the modulated decrypted digitized data to the called party through the analog network.

9. A wireline interface as claimed in claim 8 wherein when the controller receives the request to communicate secure data, the controller instructs the modem to demodulate unencrypted modulated digitized data received from the called party through the analog network, instructs the security module to encrypt the demodulated unencrypted digitized data, and instructs the digital interface to transmit the encrypted demodulated digitized data over the encrypted digital link to the digital subscriber unit.

10. A method of communicating between a digital subscriber unit and an analog network, the method comprising the steps of:

establishing an encrypted digital link with the digital subscriber unit through a digital communication network;

receiving a network number from the digital subscriber unit through the digital communication network over the encrypted digital link;

in response to the receiving the network number step, establishing a connection with a called party through the analog network;

receiving encrypted digitized voice from the digital subscriber unit over the encrypted digital link;

decrypting the encrypted digitized voice to provide decrypted digitized voice;

converting the decrypted digitized voice to analog voice suitable for transmission through the analog network;

providing the analog voice to the called party through the analog network;

wherein the steps of receiving encrypted digitized voice, decrypting the encrypted digitized voice, and providing the analog voice are performed when a request to communicate secure voice is received;

establishing an unencrypted digital link between the one digital subscriber unit; and communicating unencrypted voice with the digital subscriber unit over the unencrypted digital link prior receiving the request to communicate secure voice.

11. A method as claimed in claim 10 further comprising the step of receiving, from the digital subscriber unit through-the digital communication network, a request to initiate a connection with the analog network, the request being initiated by the digital subscriber unit providing a number of a wireline interface to the digital communication network, the wireline interface being coupled between the digital communication network and the analog network, and wherein the step establishing the encrypted digital link is performed by the wireline interface in response to the receiving the request to initiate a connection with the analog network step.

12. A method as claimed in claim 10 further comprising the step of receiving a request to communicate secure voice from either the called party or the digital subscriber unit, the request including a predetermined code received through the analog network.

13. A method as claimed in claim 10 wherein when the request to communicate secure voice is received, the method further includes the steps of:

receiving analog unencrypted voice from the called party through the analog network;

the converting the analog unencrypted voice to digital voice;

encrypting the digital voice; and transmitting the encrypted digital voice to the digital subscriber unit over the encrypted digital link.

14. A method as claimed in claim 10 wherein when a request to communicate secure data is received, the method includes the steps of:

receiving encrypted digitized data from the digital subscriber unit through the digital communication network;

decrypting the encrypted digitized data;

modulating the decrypted digitized data; and providing the modulated decrypted digitized data to the called party through the analog network.

15. A method as claimed in claim 14 wherein when the request to communicate secure data is received, the method further includes the steps of:

receiving unencrypted modulated digitized data from the called party through the analog network;

demodulating the unencrypted modulated digitized data;

encrypting the demodulated digitized data; and transmitting the encrypted demodulated digitized data over the encrypted digital link to the digital subscriber unit.

16. A method as claimed in claim 10 wherein the establishing the connection through the analog network step establishes a connection to a secure telephone with encryption capability, the method includes the steps of:

refraining from performing the decrypting the encrypted digitized voice step; and modulating the encrypted digital voice for transmission through said analog network.

17. A method as claimed in claim 16 wherein the receiving the network number step includes the steps of:

decrypting the network number;

converting the network number from digital to corresponding tones; and providing the corresponding tones to the analog network to establish the connection through the analog network.

18. A method as claimed in claim 17 wherein the establishing the encrypted digital link step includes the step of:

exchanging call set up information with the digital subscriber unit;

determining an encryption algorithm; and determining an encryption key.

19. A method of communicating between a digital subscriber unit and an analog network, the method comprising the steps of:

establishing a digital link with the digital subscriber unit through a digital network;

receiving a network number from the digital subscriber unit through the digital network over the digital link;

in response to the receiving the network number step, establishing a connection with a called party through the analog network;

receiving digitized voice from the digital subscriber unit over the unencrypted digital link;

converting the digitized voice to analog voice for transmission through the analog network;

providing the analog voice to the called party through the analog network;

receiving a request to communicate secure voice;

determining an encryption key and encryption algorithm for communicating through the digital network;

establishing an encrypted digital link with the digital subscriber unit through the digital network;

receiving encrypted digitized voice from the digital subscriber unit over the unencrypted digital link;

decrypting the encrypted digitized voice to provide decrypted digitized voice;

converting the decrypted digitized voice to decrypted analog voice for transmission through the analog network; and providing the decrypted analog voice to the called party through the analog network.

20. A method as claimed in claim 19 further comprising the steps of:

establishing a connection to a secure telephone with encryption capability through the analog network;

refraining from performing the decrypting the encrypted digitized voice step; and modulating the encrypted digitized voice for transmission through the analog network to the secure telephone.

* * * * *

UNITED STATES PATENT AND TRADEMARK OFFICE

CERTIFICATE OF CORRECTION

PATENT NO. : 6,356,638 B1
DATED : March 12, 2002
INVENTOR(S) : Douglas Allan Hardy et al.

It is certified that error appears in the above-identified patent and that said Letters Patent is hereby corrected as shown below:

Column 6,
Line 7, delete "if".

Signed and Sealed this

Twelfth Day of November, 2002

*Attest:*

JAMES E. ROGAN

*Attesting Officer* *Director of the United States Patent and Trademark Office*